(12) United States Patent
Pihl et al.

(10) Patent No.: US 10,341,675 B2
(45) Date of Patent: Jul. 2, 2019

(54) VIDEO ENCODING METHOD AND VIDEO ENCODER SYSTEM

(71) Applicant: Axis AB, Lund (SE)

(72) Inventors: Fredrik Pihl, Malmö (SE); Mats Lund, Lund (SE)

(73) Assignee: AXIS AB, Lund (SE)

( * ) Notice: Subject to any disclaimer, the term of this patent is extended or adjusted under 35 U.S.C. 154(b) by 91 days.

(21) Appl. No.: 15/412,603

(22) Filed: Jan. 23, 2017

(65) Prior Publication Data

US 2017/0223369 A1 Aug. 3, 2017

(30) Foreign Application Priority Data

Jan. 28, 2016 (EP) ..................................... 16153161

(51) Int. Cl.
*H04N 19/436* (2014.01)
*H04N 19/105* (2014.01)
(Continued)

(52) U.S. Cl.
CPC ......... *H04N 19/436* (2014.11); *H04N 19/105* (2014.11); *H04N 19/107* (2014.11);
(Continued)

(58) Field of Classification Search
CPC .. H04N 19/436; H04N 19/159; H04N 19/105; H04N 19/172; H04N 7/46; H04N 1/417
See application file for complete search history.

(56) References Cited

U.S. PATENT DOCUMENTS 5,317,411 A * 5/1994 Yoshida ................. H04N 1/648
382/232
5,497,239 A * 3/1996 Kwon ................... H04N 5/9264
375/E7.198

(Continued)

FOREIGN PATENT DOCUMENTS

JP 2010-206412 A 9/2010

OTHER PUBLICATIONS

Saraiya et al., "Encoding Solutions for MPEG Systems", Wescon/'95. Conference Record. Microelectronics Communications Technology Producing Quality Products Mobile and Portable Power Emerging Technologies, IEEE, Nov. 7, 1995, p. 732, XP032262977; DOI: 10.1109/Wescon,1995.485492; ISBN: 978-0-7803-2636-1; pp. 733, 734.

(Continued)

*Primary Examiner* — Dramos Kalapodas
(74) *Attorney, Agent, or Firm* — Volpe and Koenig, P.C.

(57) ABSTRACT

A method of encoding digital video data corresponding to a sequence of input video frames is disclosed. The input video frames are encoded into a sequence of output video frames. The method comprises encoding a first input video frame in a first encoder instance using intra-frame encoding to produce a first intra-frame, decoding the first intra-frame to produce a first decoded frame, encoding the first decoded frame in a second encoder instance to produce a first output video frame. A digital video encoding system is also disclosed, as well as a camera comprising such a system, and a computer program product for performing the method.

19 Claims, 3 Drawing Sheets

(51) Int. Cl.
*H04N 19/159* (2014.01)
*H04N 19/107* (2014.01)
*H04N 19/154* (2014.01)
*H04N 19/194* (2014.01)
*H04N 19/86* (2014.01)
*H04N 19/172* (2014.01)
*H04N 19/176* (2014.01)

(52) U.S. Cl.
CPC ......... *H04N 19/154* (2014.11); *H04N 19/159* (2014.11); *H04N 19/194* (2014.11); *H04N 19/86* (2014.11); *H04N 19/172* (2014.11); *H04N 19/176* (2014.11)

(56) References Cited

U.S. PATENT DOCUMENTS

| | | | |
|---|---|---|---|
| 5,990,955 A | 11/1999 | Koz | |
| 8,306,340 B2* | 11/2012 | Ceperkovic | H04N 19/63 382/233 |
| 8,948,529 B1* | 2/2015 | Maaninen | H04N 19/176 382/232 |
| 9,363,473 B2* | 6/2016 | Zhao | H04N 19/142 |
| 9,503,738 B2* | 11/2016 | Carmel | H04N 19/176 |
| 2001/0040700 A1* | 11/2001 | Hannuksela | H04N 19/65 382/238 |
| 2005/0036548 A1 | 2/2005 | He et al. | |
| 2006/0045181 A1 | 3/2006 | Chen | |
| 2006/0133491 A1* | 6/2006 | Lee | H04N 19/61 375/240.12 |
| 2012/0213282 A1* | 8/2012 | Choi | H04N 19/597 375/240.16 |
| 2014/0198851 A1* | 7/2014 | Zhao | H04N 19/142 375/240.16 |

OTHER PUBLICATIONS

Hua Yang et al., "Effective Flicker Removal from Periodic Intra Frames and Accurate Flicker Measurement", 15th IEEE International Conference on Image Processing: ICIP 2008; San Diego, CA (US) Oct. 12-15, 2008, IEEE, Piscataway, NJ (US) Oct. 12, 2008, pp. 2868-2871, XP03137460, ISBN: 978-1-4244-1765-0.
EP 16 15 3161.1 European Search Report (dated Apr. 7, 2016).

* cited by examiner

VIDEO ENCODING METHOD AND VIDEO ENCODER SYSTEM

FIELD OF INVENTION

The present invention relates to the field of video encoding.

BACKGROUND

In digital video systems, such as network camera monitoring systems, video sequences are compressed before transmission using various video encoding methods. In many digital video encoding systems, two main modes are used for compressing video frames of a sequence of video frames: intra mode and inter mode. In the intra mode, the luminance and chrominance channels are encoded by exploiting the spatial redundancy of the pixels in a given channel of a single frame via prediction, transform, and entropy coding. The encoded frames are called intra-frames, and may also be referred to as I-frames. Within an intra-frame, blocks of pixels, also referred to as macroblocks, are encoded in intra-mode, meaning that they are encoded with reference to a similar block within the same image frame, or raw coded with no reference at all. The inter mode instead exploits the temporal redundancy between separate frames, and relies on a motion-compensation prediction technique that predicts parts of a frame from one or more previous frames by encoding the motion in pixels from one frame to another for selected blocks of pixels. The encoded frames are called inter-frames, and may be referred to as P-frames (forward-predicted frames), which can refer to previous frames in decoding order, or B-frames (bi-directionally predicted frames), which can refer to two or more previously decoded frames, and can have any arbitrary display-order relationship of the frames used for the prediction. Within an inter-frame, blocks of pixels, also referred to as macroblocks, may be encoded either in inter-mode, meaning that they are encoded with reference to a similar block in a previously decoded image, or in intra-mode, meaning that they are encoded with reference to a similar block within the same image frame, or raw-coded with no reference at all.

At times, there is a lot of noise in the captured images. This is particularly the case in low-light conditions, such as at dusk or dawn. In such low-light conditions, long exposure times and high gain are needed, leading to increased noise, or in other words a lowered signal-to-noise ratio (SNR). Since a significant portion of the noise is dynamic, it will vary from one frame to another. This presents challenges for inter-frame encoding, because the noise will mean that even if a particular macroblock in an image that is going to be encoded depicts the same part of the captured scene as the corresponding macroblock in a previously encoded and decoded image frame used as reference frame, that macroblock will appear different. This may lead to large residuals when encoding the macroblock, which in turn implies a high output bitrate. The differences in appearance may also make it more difficult to find a suitable macroblock to refer to in the reference frame, leading to a longer search. Sometimes, no matching macroblock is found before the end of the predetermined search pattern, such that the current macroblock has to be encoded in intra mode, also leading to an increased output bitrate.

There is consequently an interest in reducing the amount of noise in the images before encoding. Various solutions are known, in which spatial and/or temporal noise filters are applied to the images before encoding. Many of these solutions may lead to satisfactory results, but some are computationally intense, and may not be useful for real-time encoding, such as for monitoring or surveillance purposes. There is thus still a need for methods and systems for reducing the impact of noise on encoding.

SUMMARY

An object of the invention is to provide a method of encoding digital video data corresponding to a sequence of input video frames, which reduces noise, such that encoding may be performed more efficiently. Another object is to provide a digital video encoding system which enables encoding without the drawbacks associated with noise described above.

According to a first aspect, these and other objects are achieved, in full or at least in part, by a method of encoding digital video data corresponding to a sequence of input video frames, wherein said input video frames are encoded into a sequence of output video frames, the method comprising: encoding a first input video frame in a first encoder instance using intra-frame encoding to produce a first intra-frame, decoding said first intra-frame to produce a first decoded frame, encoding said first decoded frame in a second encoder instance to produce a first output video frame. The sequence of output video frames may also be referred to as an encoded video stream. The encoding performed in the first encoder reduces the high frequency components of the input video frames, meaning that there is less noise in the decoded image frames input to the second encoder. In this manner, the second encoder may be allowed to operate more efficiently. With less noise in the image frames that are input to the encoder, residuals to encode in inter-frame encoding will be smaller. Further, the search for matching blocks may be quicker, because noise will not make macroblocks that depict the same part of the captured scene appear more different than is prompted by changes in the scene. Thus, for a static scene, a macroblock to be encoded will essentially appear the same as the corresponding macroblock in the reference image. Further, even if there is movement in the scene, the search for a matching block may be more likely to be successful, since the noise will not add artificial differences between the reference frame and the current frame. Thus, the likelihood of encoding blocks of inter-frames as inter-coded blocks, rather than intra-coded blocks, is increased.

The first encoder instance may be a JPEG encoder. JPEG encoding generally does not require complicated hardware, as it is not computationally intense.

Alternatively, the first encoder instance may be a block-based hybrid encoder, such as an H.264 or H.265 encoder. This may be particularly advantageous if the second encoder is also of the same type. The two encoders may then work towards the same frequency response.

The block-based hybrid encoder may decode the first intra-frame to produce the first decoded frame in the form of a first reference frame usable for inter-frame encoding. Thus, the first encoder may operate as a block-based hybrid encoder normally does, except that the output encoded images are not the ones used for storing or transmission.

According to an embodiment, the first decoded frame is encoded in the second encoder instance using intra-frame or inter-frame encoding. In this manner, an output video sequence with groups of pictures containing an intra-frame followed by zero or more inter-frames may be produced, thus enabling bitrate-efficient transmission.

In an embodiment, the first encoder instance encodes the first video input frame using a first compression ratio, and the second encoder instance encodes the first decoded frame using a second compression ratio, said second compression ratio being higher than or equal to said first compression ratio. In this manner, little image quality may be sacrificed in the first encoding step and a low output bitrate may be obtained from the second encoder for storage and/or transmission.

According to a second aspect, these and other objects are achieved, in full or at least in part, by a digital video encoding system for encoding video data corresponding to a sequence of input video frames, the system comprising: a first encoder instance arranged to encode said input video frames using intra-frame encoding to produce encoded frames, a decoder instance associated with said first encoder instance, said decoder instance being arranged to decode the encoded frames, a second encoder instance arranged to encode said decoded frames. With such a system, it is possible to achieve efficient encoding, particularly efficient inter-frame encoding, due to a decreased noise level in the images to encode in the second encoder. Residuals to encode may be decreased, and search for matching blocks for motion estimation and compensation may be facilitated.

The encoder system may be embodied in essentially the same ways as the method of the first aspect, with accompanying advantages.

According to a third aspect, these and other objects are achieved, in full or at least in part, by a camera comprising an encoding system according to the second aspect.

According to a fourth aspect, these and other objects are achieved, in full or at least in part, by a computer program product comprising a computer-readable storage medium with instructions adapted to carry out the method according to the first aspect when executed by a processor. The processor may be any kind of processor, e.g., a central processing unit (CPU), a graphics processing unit (GPU), a custom made processing device implemented in an integrated circuit, an ASIC, an FPGA, or logical circuitry including discrete components.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF THE PREFERRED EMBODIMENTS

Figure 1:
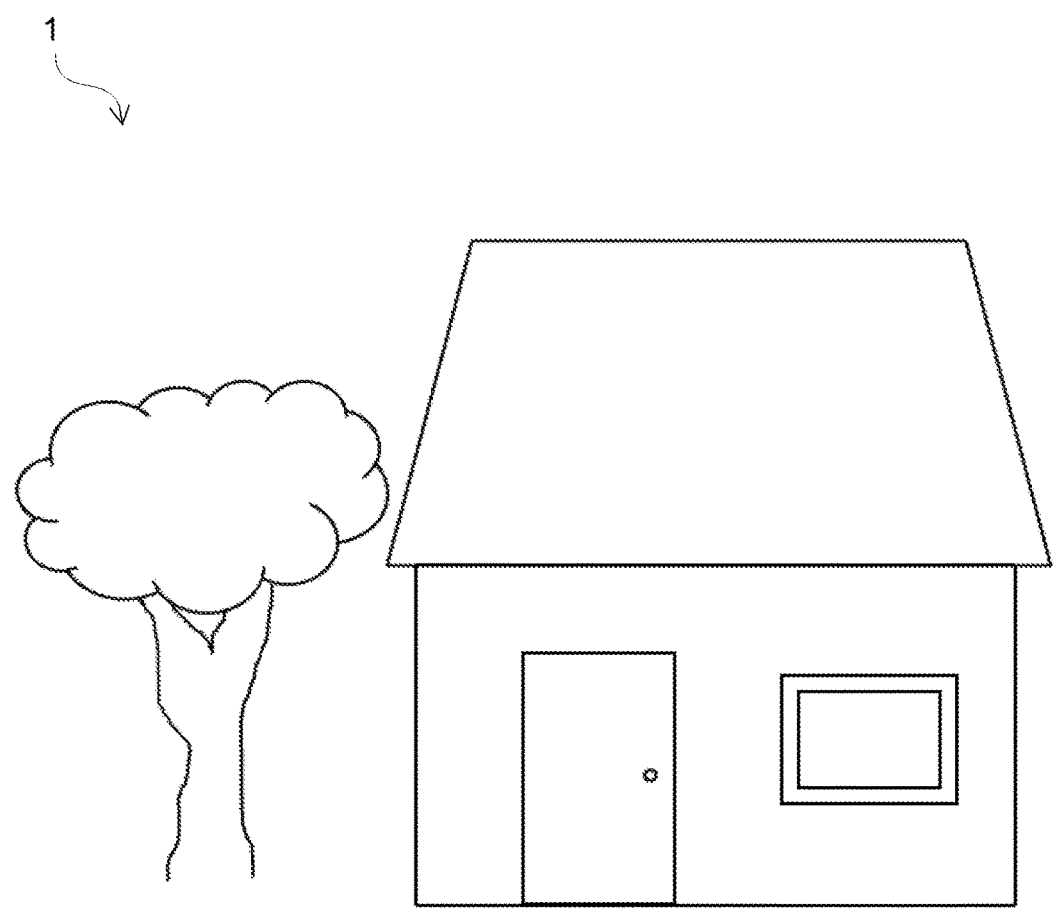
FIG. 1 is a view of a scene being captured by a camera.
Figure 1:
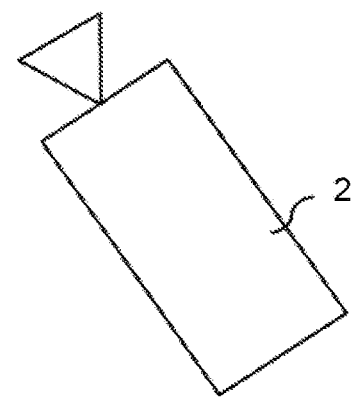

FIG. 1 illustrates a scene 1 monitored by a camera 2. Images captured by the camera 2 are encoded before being transmitted to, e.g., a control centre, where an operator or a guard may watch displayed images of monitored scenes. After encoding, the images may also be stored, either locally, such as on an SD card in the camera 2, or remotely, such as on a server in the control centre.

When capturing images using an image sensor, there is always some noise present in the signal from the sensor. Some of this noise is spatial, such as fixed-pattern noise, whereas some of the noise is temporal, such as reset noise and thermal noise. The spatial noise remains the same from one image frame to the next, but the temporal noise, per definition, varies from one frame to the next. This presents a problem when encoding an image frame using inter-frame encoding, since inter-frame encoding relies on referring to a previously encoded and decoded image frame used as a reference frame. If there is actually no or very little change in the scene from the time of capture of a first frame to the time of capture of a second, subsequent frame, encoding using intra-frame encoding may be very efficient, since most macroblocks in the second frame will look the same as the corresponding blocks in the first frame. However, temporal noise will impose differences between the first image and the second image that do not originate in the captured scene. As discussed in the background portion of this application, such noise may lead to increased output bitrates, as well as longer searches for matching macroblocks.

When searching for a matching block to be used in inter-frame encoding, if a block in the reference frame is to be considered similar enough to the block to be encoded in the current image to be used as reference block, the difference between the block in the current image frame and the potential block in the reference frame has to be below a predetermined similarity threshold. The difference may, e.g., be expressed as a sum of absolute differences (SAD). The SAD is calculated by taking the absolute difference between a pixel in the current image frame and a corresponding pixel in a compared block in the reference frame and calculating a sum of all such differences for all pixels in the block. Thus, the SAD may be expressed as follows:

$$SAD=\Sigma_{n=1}^{N}|V_{c,n}-V_{r,n}|.$$

Here, N is the number of pixels in the studied block, $V_{c,n}$ is the pixel value of pixel n in the current image frame, and $V_{r,n}$ is the pixel value of the corresponding pixel n in the reference frame. Temporal noise will lead to an increased SAD.

If the block where the search is started is considered similar to the block to be encoded, this first block is used as reference block.

If, on the other hand, the block where the search is started differs too much from the block to be encoded, i.e. if the SAID is above the predetermined threshold, the search continues to another block. Which block to continue is determined by a search pattern used for the search. Generally, there is a limit set for how far the search is continued. If no similar block has been found when the search pattern limit is reached, the block to be encoded is not encoded in inter mode, but instead encoded in intra mode.

Noise is generally always present in the captured image frames, but it becomes more pronounced if images are captured in low-light conditions, such as at dusk or dawn, when long exposure times are needed and a high gain is used. Noise also becomes more pronounced at high temperatures, because many noise sources in image sensors are worsened by raised temperatures. According to the invention, the impact of the noise may be reduced using a method and/or a digital video encoding system which will be described further in the following.

Figure 2:
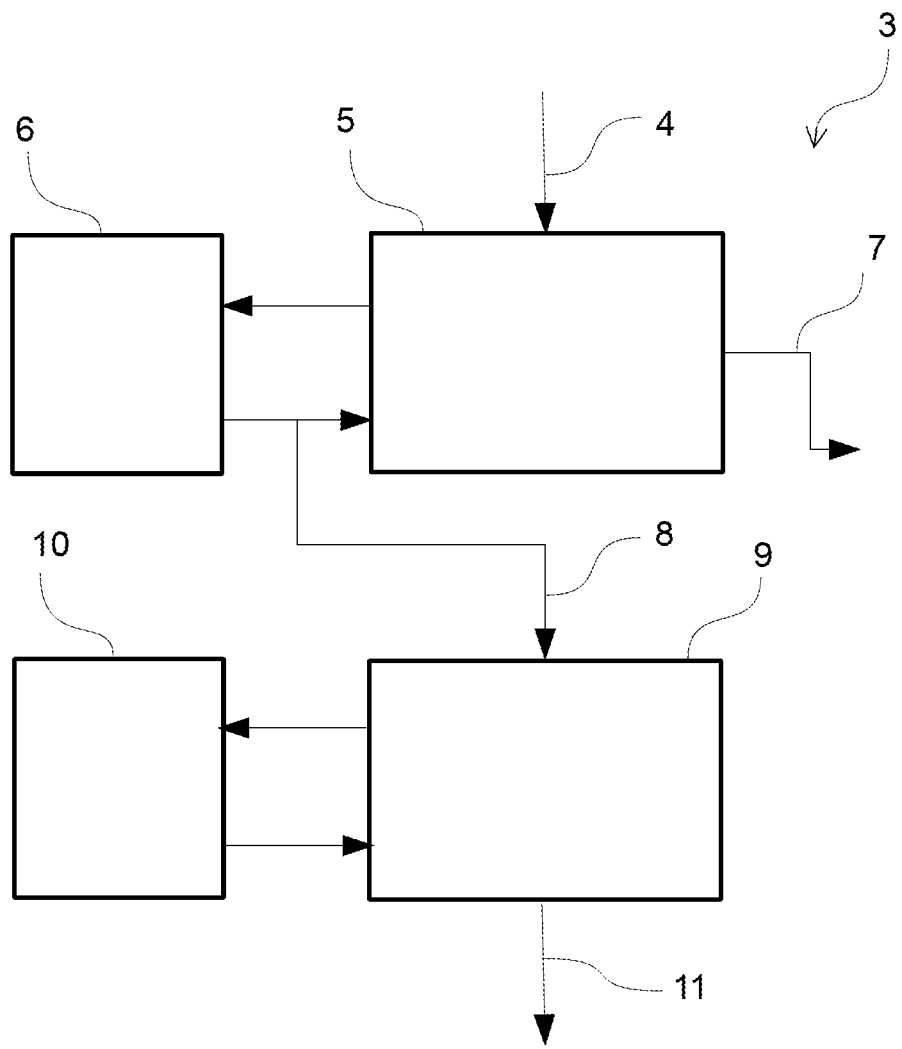
FIG. 2 is a block diagram of an embodiment of a digital video encoding system.

FIG. 2 is a block diagram of an embodiment of a digital video encoding system 3. Digital video data originating from the image sensor, and pre-processed by pre-processing procedures, such as Bayer pattern sampling, demosaicing, sharpening, adding contrast, tone mapping, colour correction, blurring, and HDR merging, are provided via an image input 4 to a first encoder 5. The first encoder 5 may, e.g., be a H.264 compliant encoder, but is according to the invention controlled such as to encode image frames using only intra-frame encoding. The intra-frames are passed to a first decoder 6 associated with the first encoder 5, as is normally done for producing reference frames for inter-frame encoding of subsequent image frames. Thus, for each input image frame, a corresponding encoded and decoded reference frame is produced. However, according to the invention, the encoded intra-frames are not themselves transmitted to the control centre for display or storage. Instead, the encoded intra-frames may simply be discarded, as symbolised by arrow 7 in FIG. 2.

The decoded frames, or reference frames, are passed from the first decoder 6 to an input 8 of a second encoder 9. The second encoder may be similar or even identical to the first encoder 5, but may be controlled using different parameters, such that the second encoder 9 encodes a more common video stream, with groups of pictures (GOPs) containing intra-frames as well as inter-frames. As is known per se, the encoded images from the second encoder 9 are passed to an associated second decoder 10 for decoding to form reference frames for use in inter mode encoding of subsequent image frames, and the encoded images are at the same time output from the second encoder 9 through an output 11. The output video frames may be stored locally and/or transmitted to a remote location, such as a control centre, where they may be viewed and/or stored.

The encoder system 3 may be integrated in a camera, such as the camera 2 indicated in FIG. 1. Alternatively, the encoder system 3 may be a separate unit, operationally connected to a camera.

Although a variant of the inventive method has above been described in connection with the description of an embodiment of the inventive encoding system, for the sake of clarity, a variant of the method will now also be described with reference to FIG. 3.

Figure 3:
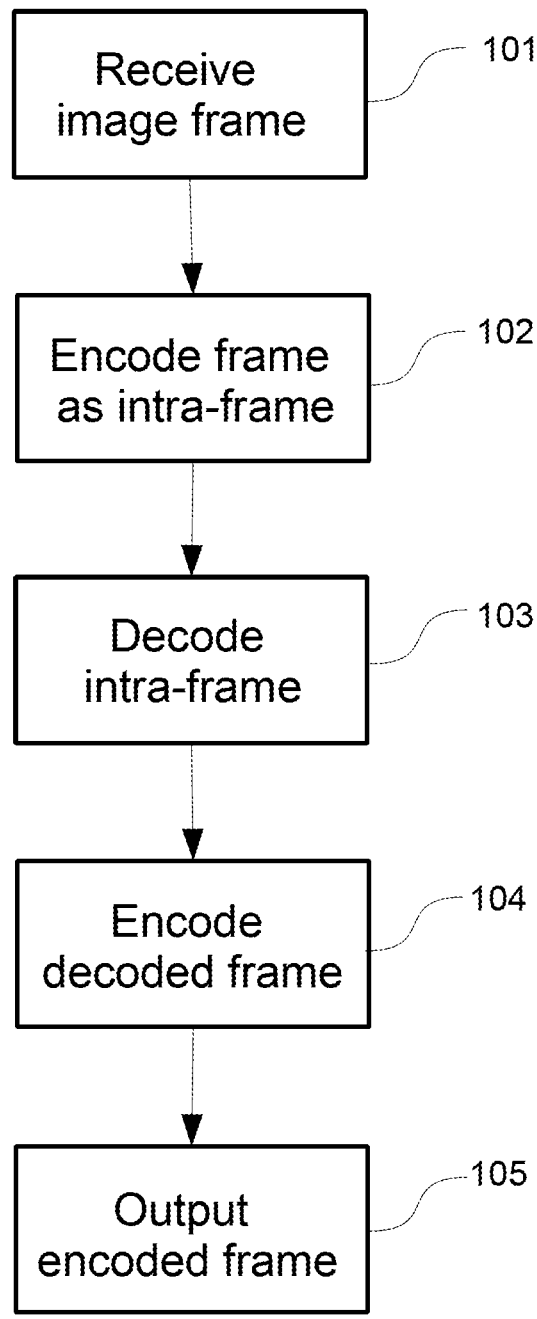
FIG. 3 is a flow chart showing a variant of the inventive method.

FIG. 3 is a flow chart illustrating a variant of the encoding method of the invention. In a first step 101 digital video data corresponding to a first video frame or image frame is received. Then, in step 102, the first image frame is encoded in a first encoder as a first intra-frame, i.e. without reference to any other image frame. The intra-frame is decoded in step 103, as is known per se for forming a first reference frame. The non-decoded intra-frame itself is not used, but may be discarded. In step 104, the decoded frame, i.e. the first reference frame, is encoded in a second encoder. The second encoder is arranged to produce intra-frames as well as inter-frames, so the first frame in a GOP will be encoded as an intra-frame, and subsequent frames will be encoded as inter-frames, until a new GOP is started. In step 105, the encoded frame is output as an output video frame, which may be stored locally and/or transmitted elsewhere for displaying and/or storing.

The process illustrated in FIG. 3 is repeated for subsequent input video frames in order to produce an encoded video stream. Thus, a second input video frame is received, and then encoded in the first encoder as an intra-frame. This second intra-frame is decoded to form a second reference frame. The second reference frame is passed to the second encoder, while the second intra-frame itself is discarded. In the second encoder, the second reference frame is encoded as either an intra-frame or an inter-frame depending on the current GOP length and how far into the GOP the frame is to be located. Thus, if the second frame is not to start a new GOP, it is encoded as an inter-frame.

Depending on the input video frame rate, the first input video frame need not have passed all the way through the process and be output as an encoded frame when a second input video frame is received. The first frame may very well be processed by the second encoder, while the second frame is being processed by the first encoder, such that the two encoders may be said to operate in tandem. Thereby, no latency is added by the inventive encoding method.

Referring to FIG. 2, as well as to FIG. 3, the first encoder 5 may be controlled to use a first compression ratio, and the second encoder 9 may be controlled to use a second compression ratio, which is higher than or equal to the first compression ratio. Thus, the image quality of the intra-frames encoded by the first encoder will be higher than or equal to the image quality of the video frames output from the second encoder. For instance, if the first and second encoders 5, 9 are both H.264 encoders, the first encoder 5 may use a first quantisation parameter $QP_1$ and the second encoder 9 may use a second quantisation parameter $QP_2$. Just as examples, $QP_1$ may be 10 and $QP_2$ may be 15.

Since the first encoder uses a low compression ratio and only encodes intra-frames, the output bit rate of the first encoder may be high. Still, this does not pose a problem, since the output of the first encoder is not intended to be transmitted for viewing or storing, but only used for producing reference frames that are then encoded in the second encoder. Since the second encoder uses a compression ratio that is at least as high as the one used by the first encoder, the output bit rate of the second encoder may be lower than the one from the first encoder. Moreover, the output bit rate of the second encoder may be significantly lowered by the use of inter-frames in addition to intra-frames.

By the quantisation that is done in the first encoder during intra-frame encoding, high frequency components of the video data is removed, meaning that noise is removed. Therefore, the encoding done in the second encoder may be more efficient for a number of reasons. When temporal noise is removed, macroblocks depicting the same static portion of a scene in two successive video frames will be more similar, thereby leading to smaller residuals to encode. Further, searching for a matching block in the reference frame may be quicker, because there is less variation in the corresponding macroblock from one frame to the next. This also means that it is more likely that a matching macroblock is found before the search reaches the limit set for the search pattern, thus increasing the likelihood of encoding a macroblock in an inter-frame as an inter-coded block, and not as an intra-coded block.

It will be appreciated that a person skilled in the art can modify the above described embodiments in many ways and still use the advantages of the invention as shown in the embodiments above. As an example, the first encoder need not be capable of encoding anything but intra-frames, and may, e.g., be a JPEG encoder. Alternatively, the first and second encoders may be essentially identical, but controlled with different parameters, such that the first encoder encodes only intra frames, and the second encoder encodes intra-frames as well as inter-frames.

The encoder system may be embodied as software, firmware, hardware, or a combination thereof. The first encoder and the second encoder may, e.g., be embodied as software running on one and the same processor, and need not be separate units. The encoders are therefore also referred to as a first encoder instance and a second encoder instance.

The invention is applicable to any block based hybrid codecs, e.g., a H.264, H.265, MPEG-4 Part 2, or VP9 codec.

In the examples above, the first decoder is described as being associated with the first encoder. It may be noted that if the first encoder is a block-based hybrid encoder, the first decoder is advantageously integrated in the first encoder, as is well known in the art in order to avoid drift caused by rounding off, etc. However, it may also be feasible to have a separate first decoder. This is particularly true if the first encoder is a JPEG encoder, as a JPEG encoder does not normally produce reference frames.

The process step performed by the first encoder need not strictly be an encoding step. Instead, another procedure that reduces the spatial complexity of the input video frames may be performed. For instance, a quantisation of the input video frames may be performed, and then a DE quantisation or inverse quantisation may be performed for providing the input to the second encoder.

In the examples above, the invention is described in connection with a camera. The camera may be a monitoring camera. Further, the camera may be any type of camera, e.g., a camera employing visible light, an IR camera or a thermal camera. The camera may be a digital camera, but the invention may also be used with analogue cameras. In such case, images from an analogue camera may be converted to digital format using a digitalization unit.

Instead of in a camera, the image sensor capturing the image frames may be arranged in another type of image capturing device.

The images may also be generated by a visual light sensor, a thermal sensor, a time-of-flight sensor, or other types of image generating sensors capable of generating information representative of image frames to be encoded using intra-frame and inter-frame video compression technologies.

Thus, the invention should not be limited to the shown embodiments but should only be defined by the appended claims.

What is claimed is:

1. A method of encoding digital video data corresponding to a sequence of input video frames, wherein said input video frames are encoded into a sequence of output video frames by a video encoding apparatus, the method comprising:

encoding a first input video frame of the sequence of input video frames, in a first encoder instance of the video encoding apparatus, using intra-frame encoding to produce a first intra-frame, the first encoder including an output that discards intra-frames including the first intra-frame, instead of transmitting the intra-frames to a buffer for subsequent storage or display, decoding said first intra-frame to produce a first decoded frame by a decoder of the video encoding apparatus, the decoder providing decoded intra-frames to a second encoder instance, encoding said first decoded frame in the second encoder instance to produce a first output video frame, wherein the second encoder instance outputs a video stream using intra mode and inter mode prediction, wherein the video stream includes the first output video frame.

2. The method according to claim 1, further comprising discarding the encoded first intra-frame before being used for displaying.

3. The method according to claim 1, further comprising encoding a second input video frame in the first encoder instance using intra-frame encoding to produce a second intra-frame, decoding said second intra-frame to produce a second decoded frame, encoding said second decoded frame in the second encoder instance to produce a second output video frame, wherein the act of encoding said first decoded frame to produce the first output video frame is performed in tandem with the act of encoding the second input video frame to produce the second intra-frame.

4. The method according to claim 3, further comprising discarding the encoded second intra-frame before being used for displaying.

5. The method according to claim 1, wherein the first encoder instance is a JPEG encoder.

6. The method according to claim 1, wherein the first encoder instance is a block-based hybrid encoder.

7. The method according to claim 6, wherein the first encoder instance decodes said first intra-frame to produce said first decoded frame in the form of a first reference frame usable for inter-frame encoding.

8. The method according to claim 1, wherein the first decoded frame is encoded in the second encoder instance using intra-frame or inter-frame encoding.

9. The method according to claim 1, wherein the first encoder instance encodes the first video input frame using a first compression ratio, and wherein the second encoder instance encodes the first decoded frame using a second compression ratio, said second compression ratio being higher than or equal to said first compression ratio.

10. A digital video encoder system including a video encoding apparatus for encoding video data corresponding to a sequence of input video frames, the system comprising:

a first encoder instance of the video encoding apparatus arranged to encode said input video frames using intra-frame encoding to produce encoded frames, the first encoder including an output configured to discard intra-frames including the first intra-frame, instead of transmitting the intra-frames to a buffer for subsequent storage or display, a decoder instance associated with said first encoder instance, said decoder instance being arranged to decode the encoded frames, the decoder being a part of the video encoding apparatus, the decoder arranged to provide decoded intra-frames to a second encoder instance, the second encoder instance, arranged to encode said decoded frames to produce encoded output frames, wherein the second encoder is arranged to output a video stream using intra mode and inter mode prediction, wherein the video stream includes the encoded output frames.

11. The encoder system according to claim 10, wherein the first encoder instance is configured to discard the encoded frames upon the decoder instance having decoded the encoded frames.

12. The encoder system according to claim 10, wherein the first and second encoder instances are configured to work in tandem.

13. The encoder system according to claim 10, wherein the first encoder instance is a JPEG encoder.

14. The encoder system according to claim 10, wherein the first encoder instance is a block-based hybrid encoder.

15. The encoder system according to claim 14, wherein the decoder instance is arranged to decode the intra-frames to produce decoded frames in the form of reference frames usable for inter-frame encoding.

16. The encoder system according to claim 10, wherein the second encoder instance is capable of encoding the decoded frames using intra-frame and inter-frame encoding.

17. The encoder system according to claim 10, wherein the first encoder instance is arranged to encode the video input frames using a first compression ratio, and wherein the second encoder instance is arranged to encode the decoded frames using a second compression ratio, said second compression ratio being higher than or equal to said first compression ratio.

18. A camera comprising a digital video encoder system according to claim 10.

19. A non-transitory computer-readable medium storing instructions that, when executed in a digital video encoder system, cause the processing system to perform a method, the method comprising:

encoding a first input video frame of the sequence of input video frames, in a first encoder instance of a video encoding apparatus, using intra-frame encoding to produce a first intra-frame, the first encoder including an output that discards intra-frames including the first intra-frame, instead of transmitting the intra-frames to a buffer for subsequent storage or display;

decoding said first intra-frame to produce a first decoded frame by a decoder of the video encoding apparatus, the decoder providing decoded intra-frames to a second encoder instance; and encoding said first decoded frame in the second encoder instance to produce a first output video frame, wherein the second encoder instance outputs a video stream using intra mode and inter mode prediction, wherein the video stream includes the first output video frame.

* * * * *